United States Patent
Swanson et al.

(10) Patent No.: US 8,815,141 B2
(45) Date of Patent: Aug. 26, 2014

(54) METHOD FOR BUILDING THREE-DIMENSIONAL MODELS WITH EXTRUSION-BASED ADDITIVE MANUFACTURING SYSTEMS

(75) Inventors: William J. Swanson, St. Paul, MN (US); Kevin C. Johnson, Minneapolis, MN (US); Timothy A. Hjelsand, Waconia, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 415 days.

(21) Appl. No.: 12/888,098

(22) Filed: Sep. 22, 2010

(65) Prior Publication Data
US 2012/0068378 A1  Mar. 22, 2012

(51) Int. Cl.
*B28B 1/14* (2006.01)

(52) U.S. Cl.
USPC ........ 264/308; 264/401; 425/174.4; 425/375; 425/385

(58) Field of Classification Search
USPC ................ 264/308, 401; 425/174.4, 375, 385
See application file for complete search history.

(56) References Cited

U.S. PATENT DOCUMENTS

| | | | |
|---|---|---|---|
| 2,889,581 A | 6/1959 | Vanderhoof | |
| 3,175,772 A | 3/1965 | Marshall | |
| 4,749,347 A | 6/1988 | Valavaara | |
| 4,797,313 A | 1/1989 | Stolk et al. | |
| 5,121,329 A | 6/1992 | Crump | |
| 5,169,081 A | 12/1992 | Goedderz | |
| 5,303,141 A | 4/1994 | Batchelder et al. | |
| 5,312,224 A | 5/1994 | Batchelder et al. | |
| 5,340,433 A | 8/1994 | Crump | |
| 5,342,687 A | 8/1994 | Iwai et al. | |
| 5,503,785 A | 4/1996 | Crump et al. | |
| 5,738,817 A | 4/1998 | Danforth et al. | |
| 5,747,102 A | 5/1998 | Smith et al. | |
| 5,764,521 A | 6/1998 | Batchelder et al. | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,030,199 A | 2/2000 | Tseng | |

(Continued)

FOREIGN PATENT DOCUMENTS

| | | |
|---|---|---|
| EP | 0423388 A1 | 4/1991 |
| EP | 083323 A2 | 4/1998 |
| GB | 816016 | 7/1959 |

OTHER PUBLICATIONS

U.S. Appl. No. 12/612,329, filed Nov. 4, 2009, entitled "Ribbon Liquefier for Use in Extrusion-Based Digital Manufacturing Systems", pp. 1-38.

(Continued)

*Primary Examiner* — Joseph S Del Sole
*Assistant Examiner* — David N Brown, II
(74) *Attorney, Agent, or Firm* — Brian R. Morrison; Westman, Champlin & Koehler, P.A.

(57) ABSTRACT

A method for building a three-dimensional model with an extrusion-based additive manufacturing system having an extrusion head, the method comprising depositing a consumable material from a liquefier assembly at an extrusion rate to substantially normalize a meniscus height within the liquefier assembly.

17 Claims, 6 Drawing Sheets

(56) References Cited

U.S. PATENT DOCUMENTS

| | | | |
|---|---|---|---|
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,161,592 A | 12/2000 | Yamamoto et al. | |
| 6,228,923 B1 | 5/2001 | Lombardi et al. | |
| 6,234,995 B1 | 5/2001 | Peacock, III | |
| 6,257,517 B1 | 7/2001 | Babish et al. | |
| 6,530,765 B1 | 3/2003 | Zdrahala et al. | |
| 6,547,995 B1 | 4/2003 | Comb | |
| 6,645,412 B2 | 11/2003 | Priedeman, Jr. | |
| 6,685,866 B2 | 2/2004 | Swanson et al. | |
| 6,695,810 B2 | 2/2004 | Peacock, III et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 * | 11/2004 | Comb | 264/40.7 |
| 6,869,559 B2 | 3/2005 | Hopkins | |
| 6,923,634 B2 | 8/2005 | Swanson et al. | |
| 6,998,087 B1 | 2/2006 | Hanson et al. | |
| 7,122,246 B2 | 10/2006 | Comb et al. | |
| 7,172,715 B2 | 2/2007 | Swanson et al. | |
| 7,229,586 B2 | 6/2007 | Dunlap et al. | |
| 7,318,720 B2 | 1/2008 | Pabedinskas | |
| 7,363,686 B2 | 4/2008 | Fukuyasu et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,680,555 B2 * | 3/2010 | Dunn et al. | 700/119 |
| 7,789,649 B2 | 9/2010 | Diekhaus et al. | |
| 8,021,593 B2 | 9/2011 | Murata et al. | |
| 8,038,430 B2 | 10/2011 | Swanson et al. | |
| 2005/0129941 A1 | 6/2005 | Comb et al. | |
| 2005/0261722 A1 | 11/2005 | Crocker et al. | |
| 2007/0003656 A1 | 1/2007 | LaBossiere et al. | |
| 2007/0228590 A1 * | 10/2007 | LaBossiere et al. | 264/40.1 |
| 2009/0035405 A1 | 2/2009 | Leavitt | |
| 2009/0079101 A1 | 3/2009 | Laubersheimer et al. | |
| 2009/0263582 A1 | 10/2009 | Batchelder | |
| 2009/0273122 A1 | 11/2009 | Batchelder et al. | |
| 2009/0274540 A1 | 11/2009 | Batchelder et al. | |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0161356 A1 | 6/2010 | Louie et al. | |
| 2010/0288981 A1 | 11/2010 | Marcolongo et al. | |
| 2010/0327479 A1 | 12/2010 | Zinniel et al. | |
| 2011/0074065 A1 | 3/2011 | Batchelder et al. | |
| 2011/0076496 A1 | 3/2011 | Batchelder et al. | |

OTHER PUBLICATIONS

U.S. Appl. No. 12/612,333, filed Nov. 4, 2009, entitled "Non-Cylindrical Filaments for Use in Extrusion-Based Digital Manufacturing Systems", pp. 1-43.

U.S. Appl. No. 12/820,370, filed Jun. 22, 2010, entitled "Consumable Materials Having Customized Characteristics", pp. 1-30.

U.S. Appl. No. 12/841,341, filed Jul. 22, 2010, entitled "Multiple-Zone Liquefier Assembly for Extrusion-Based Additive Manufacturing Systems", pp. 1-21.

U.S. Appl. No. 12/888,087, filed Sep. 22, 2010, entitled "Liquefier Assembly for Use in Extrusion-Based Additive Manufacturing Systems", pp. 1-45.

"Plastruder MK5 Assembly", MakerBot Industries, http://wiki.makerbot.com/plastruder-mk5-assembly, last updated on Dec. 8, 2010, pp. 1-52.

* cited by examiner

METHOD FOR BUILDING THREE-DIMENSIONAL MODELS WITH EXTRUSION-BASED ADDITIVE MANUFACTURING SYSTEMS

CROSS-REFERENCE TO RELATED APPLICATION(S)

Reference is hereby made to U.S. patent application Ser. No. 12/888,087, filed on Sep. 22, 2010, and entitled "Liquefier Assembly For Use In Extrusion-Based Additive Manufacturing Systems", the disclosure of which is incorporated by reference.

BACKGROUND

The present disclosure relates to additive manufacturing systems for building three-dimensional (3D) models with layer-based additive manufacturing techniques. In particular, the present disclosure relates to methods for building 3D models with extrusion-based additive manufacturing systems.

An extrusion-based additive manufacturing system (e.g., fused deposition modeling systems developed by Stratasys, Inc., Eden Prairie, Minn.) is used to build a 3D model from a digital representation of the 3D model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

SUMMARY

A first aspect of the present disclosure is directed to a method for building a three-dimensional model with an extrusion-based additive manufacturing system having an extrusion head. The method includes depositing a consumable material from a liquefier assembly of the extrusion head at one or more extrusion rates while moving the extrusion head along a first portion of a generated tool path. The method also includes reducing the extrusion rate from the one or more extrusion rates to a slower, constant extrusion rate at a predetermined point before an end point of the generated tool path. The method further includes depositing the consumable material from the liquefier assembly at the reduced extrusion rate while moving the extrusion head along a second portion of the generated tool path bounded by the predetermined point and the end point to substantially normalize a meniscus height within the liquefier assembly.

Another aspect of the present disclosure is directed to a method for building a three-dimensional model with an extrusion-based additive manufacturing system having an extrusion head, where the method includes generating tool paths for building a plurality of layers of the three-dimensional model, where each of the generated tool paths comprises a start point and an end point. The method also includes generating a set point between the start point and the end point for at least a first tool path of the generated tool paths. The method further includes depositing a consumable material from a liquefier assembly of the extrusion head at one or more extrusion rates while moving the extrusion head along the first tool path between the start point and the set point, and depositing the consumable material from the liquefier assembly at a reduced and constant extrusion rate while moving the extrusion head along the first tool path between the set point and the end point.

Another aspect of the present disclosure is directed to a method for building a three-dimensional model with an extrusion-based additive manufacturing system having an extrusion head, where the method includes feeding a consumable material filament into a liquefier assembly of the extrusion head. The method also includes melting the consumable material filament in the liquefier to form a melt of molten material, where the melt defines a meniscus in the liquefier tube. The method further includes extruding the melt out of the liquefier assembly, and restricting movement of the meniscus along a longitudinal length of the liquefier assembly.

DETAILED DESCRIPTION

The present disclosure is directed to a method for operating liquefier assemblies to build 3D models and support structures with extrusion-based additive manufacturing systems.

As discussed below, a liquefier assembly is operated in a manner that normalizes a meniscus height within the liquefier assembly upon reaching an end point of a tool path. This technique reduces variations in extrusion rates and provides good seam quality for the 3D models. Additionally, when this technique is used with liquefier assemblies that transition quickly from standby states to operating states, the deposition process may be performed in a substantially continuous manner, without the need for purge operations.

Figure 1:
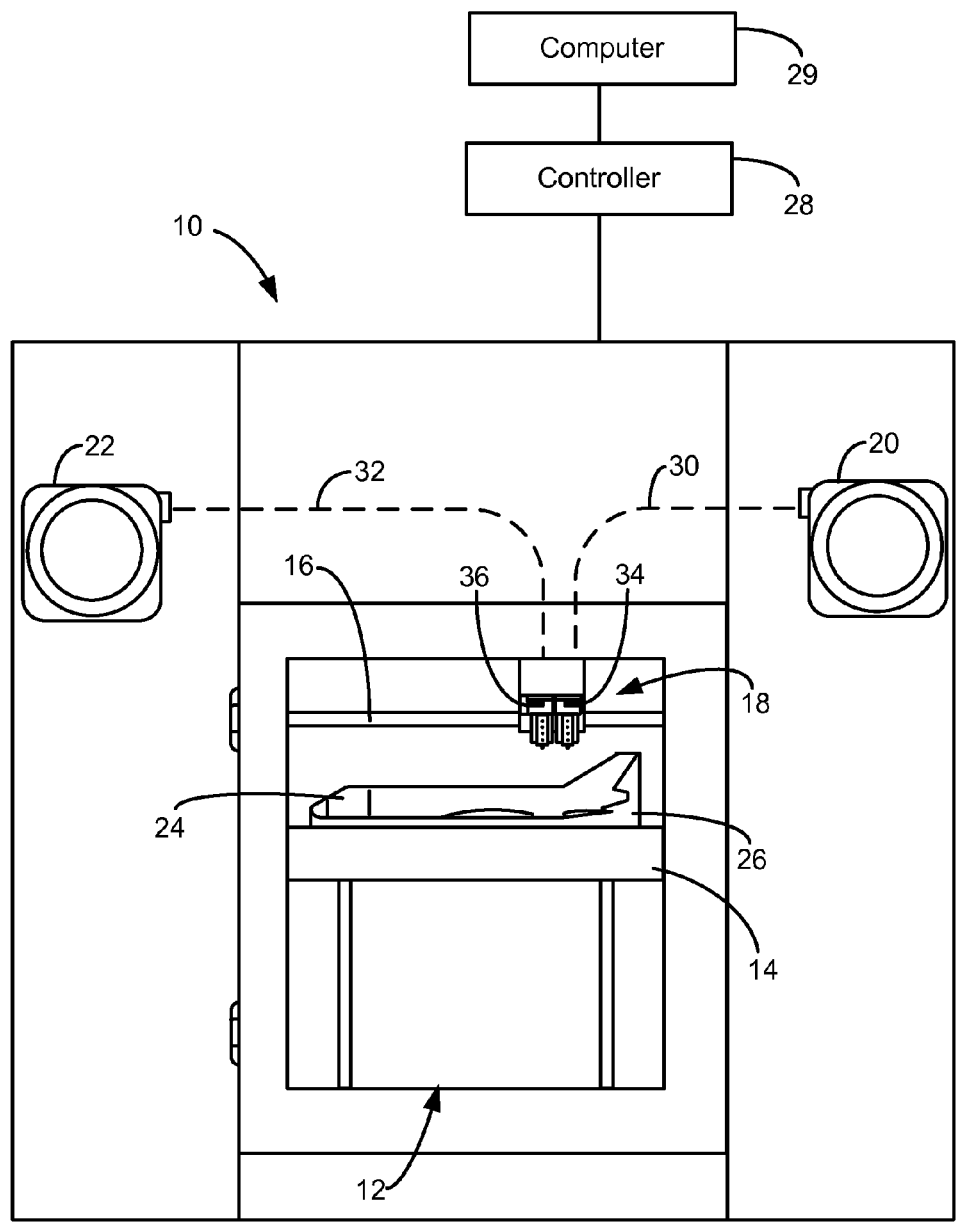
FIG. 1 is a front view of an extrusion-based additive manufacturing system for building 3D models and support structures.

As shown in FIG. 1, system 10 is an exemplary extrusion-based additive manufacturing system for building 3D models, and includes build chamber 12, platen 14, gantry 16, extrusion head 18, and supply sources 20 and 22. Examples of suitable systems for system 10 include extrusion-based additive manufacturing systems, such as fused deposition modeling systems developed by Stratasys, Inc., Eden Prairie, Minn. As discussed below, system 10 is a suitable system for building 3D models with good seam qualities, pursuant to the method of the present disclosure.

Build chamber 12 contains platen 14, gantry 16, and extrusion head 18 for building a 3D model (referred to as 3D model 24) and optionally a corresponding support structure (referred to as support structure 26). Platen 14 is a platform on which 3D model 24 and support structure 26 are built, and desirably moves along a vertical z-axis based on signals provided from controller 28, where controller 28 communicates with computer 29.

Gantry 16 is a guide rail system that is desirably configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. In the embodiment shown in FIG. 1, extrusion head 18 is a dual-tip extrusion head configured to deposit modeling and support materials from supply source 20 and supply source 22, respectively. Examples of suitable extrusion heads for extrusion head 18 include those disclosed in Crump et al., U.S. Pat. No. 5,503,785; Swanson et al., U.S. Pat. No. 6,004, 124; LaBossiere, et al., U.S. Pat. No. 7,604,470; and Leavitt, U.S. Pat. No. 7,625,200. Furthermore, system 10 may include a plurality of extrusion heads 18 for depositing modeling and/or support materials from one or more tips.

The modeling material is supplied to extrusion head 18 from supply source 20 via feed line 30, thereby allowing extrusion head 18 to deposit the modeling material to build 3D model 24. Correspondingly, the support material is supplied to extrusion head 18 from supply source 22 via feed line 32, thereby allowing extrusion head 18 to deposit the support material to build support structure 26.

The consumable materials may be provided to an extrusion-based additive manufacturing system in a variety of different media. Commonly, the material is supplied in the form of a continuous filament. For example, in system 10, the modeling and support materials may be provided as continuous filament strands fed respectively from supply sources 20 and 22, as disclosed in Swanson et al., U.S. Pat. No. 6,923, 634; Comb et al., U.S. Pat. No. 7,122,246; and Taatjes et al, U.S. Patent Application Publication Nos. 2010/0096485 and 2010/0096489. Examples of suitable average diameters for the filament strands of the modeling and support materials range from about 1.27 millimeters (about 0.050 inches) to about 3.0 millimeters (about 0.120 inches).

The terms "about" and "substantially" are used herein with respect to measurable values and ranges due to expected variations known to those skilled in the art (e.g., limitations and variabilities in measurements). Additionally, the terms "three-dimensional model" and "3D model" refer to objects, parts, and the like built using layer-based additive manufacturing techniques, and are not intended to be limited to any particular use.

Prior to a build operation, computer 29 may receive a digital representation of 3D model 24. Computer 29 is one or more computer-based systems that communicates with system 10 (e.g., with controller 28), and may be separate from system 10, or alternatively may be an internal component of system 10. Upon receipt of the digital representation of 3D model 24, computer 29 may reorient the digital representation and generate one or more supports for any overhanging regions that require vertical support (e.g., with support structure 28).

Computer 29 may then slice the digital representation and generate supports in multiple layers. For each layer, computer 29 may then generate one or more tool paths for extrusion head 18 to follow for building each layer of 3D model 24 and support structure 26. The generation of the tool path(s) for a layer of 3D model 24 may initially involve generating one or more contour tool paths that define the perimeter(s) of 3D model 24 for the given layer. Based on each generated contour tool path, computer 29 may then generate one or more additional tool paths (e.g., raster paths) to fill in the interior region(s) defined by the perimeter(s), as necessary. As discussed below, computer 29 also desirably generates a set point along each tool path, where the set points allow the meniscus heights in liquefier assemblies of extrusion head 18 to be normalized.

One or more tool paths for the layer of support structure 26 may also be generated in the same manner. This process may then repeated be for each sliced layer of the digital representation, and the generated data may be stored on any suitable computer storage medium (e.g., on a storage device of computer 29). The generated data may also be transmitted from computer 12 to controller 28 for building 3D model 24 and support structure 26.

During a build operation, controller 28 directs one or more drive mechanisms, such as drive mechanisms 34 and 36, to intermittently feed the modeling and support materials to extrusion head 18 from supply sources 20 and 22. Examples of suitable drive mechanisms for drive mechanisms 34 and 36 include those disclosed in Crump et al., U.S. Pat. No. 5,503, 785; Swanson et al., U.S. Pat. No. 6,004,124; LaBossiere, et al., U.S. Pat. Nos. 7,384,255 and 7,604,470; Leavitt, U.S. Pat. No. 7,625,200; and Batchelder et al., U.S. Patent Application Publication No. 2009/0274540.

For each layer, controller 28 then directs gantry 16 to move extrusion head 18 around in the horizontal x-y plane within build chamber 12 based on the generated tool paths. The received modeling and support materials are then deposited onto platen 14 to build the layer of 3D model 24 and support structure 26 using the layer-based additive manufacturing technique.

The formation of each layer of 3D model 24 and support structure 26 may be performed in an intermittent manner in which the modeling material may initially be deposited to form the layer of 3D model 24. Extrusion head 18 may then be toggled to deposit the support material to form the layer of support structure 26. The reciprocating order of modeling and support materials may alternatively be used. The non-toggled liquefier assembly of extrusion head 18 may be retained in a standby state, in which the liquefier assembly is cooled down to prevent its material from being extruded. The given liquefier assembly may then be heated up to a stable operating state and toggled for use in a subsequent deposition run.

The deposition process may then be performed for each successive layer to build 3D model 24 and support structure 26. Support structure 26 is desirably deposited to provide vertical support along the z-axis for overhanging regions of the layers of 3D model 24, allowing 3D model 24 to be built with a variety of geometries. After the build operation is complete, the resulting 3D model 24/support structure 26 may be removed from build chamber 12, and support structure 26 may be removed from 3D model 24.

Figure 2A:
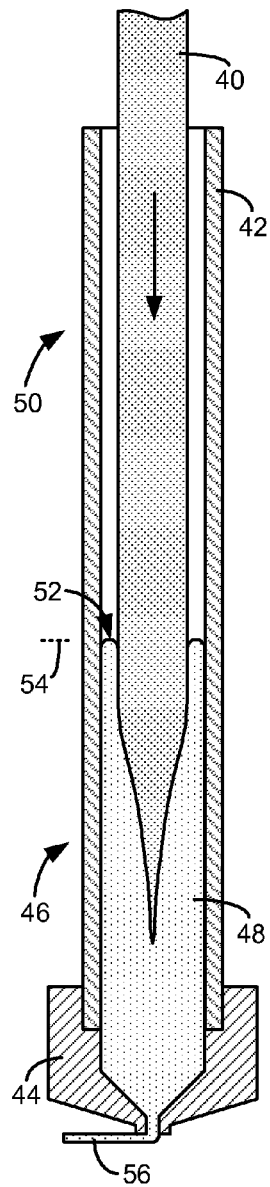
FIG. 2A is a side sectional view of a liquefier assembly in use with a filament.
Figure 2B:
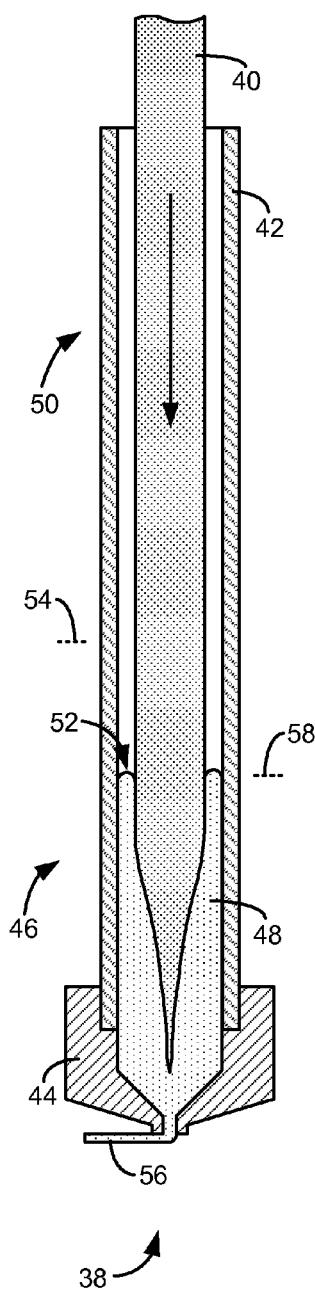
FIG. 2B is a side sectional view of the liquefier assembly in use with the filament, which illustrates a meniscus dry down effect due to an increased filament feed rate.
Figure 2C:
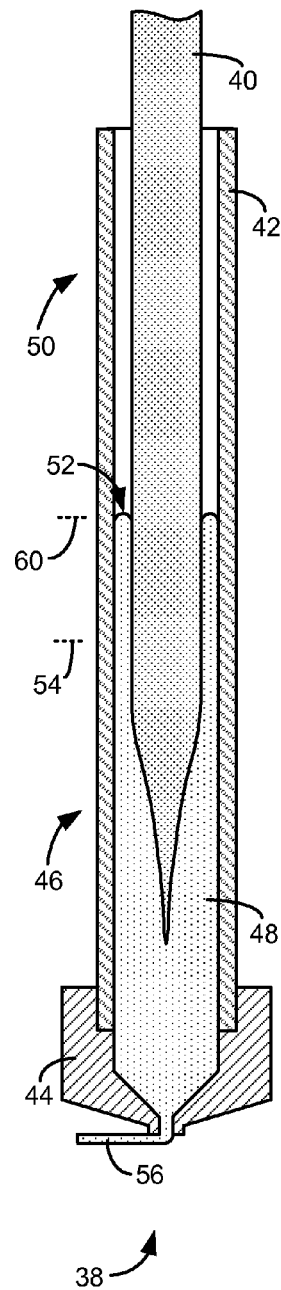
FIG. 2C is a side sectional view of the liquefier assembly in use with the filament, which illustrates a raised meniscus due to latent heating and thermal expansion.

FIGS. 2A-2C illustrate liquefier assembly 38 in use with filament 40. As shown in FIG. 2A, liquefier assembly 38 includes cylindrical liquefier tube 42 and extrusion tip 44, and is shown melting and extruding the material of filament 40. Liquefier assembly 38 is an example of a suitable liquefier assembly for use in extrusion head 18 (shown in FIG. 1).

In the shown example of FIGS. 2A-2C, filament 40 may be driven downward with a filament drive mechanism of the extrusion-based additive manufacturing system (e.g., drive mechanism 34). Filament 40 is heated to be flowable in liquefier assembly 38, while at the same time a portion of filament 40 entering liquefier assembly 38 remains solid. The strand of filament 40 acts like a piston, and resulting pressurization impels molten material out of extrusion tip 44. The flow rate of material extruded from extrusion tip 44 is controlled by the rate at which filament 40 enters liquefier assembly 38. The material is deposited from the extrusion tip 44 in "roads" according to tool paths generated from design data, and the deposited material solidifies to form the model. Any deviations between the deposited roads and a desired extrusion profile impair the model quality. To build a 3D model which accurately matches the design data, it is thus desirable to accurately predict the flow rate of extruded material.

During a deposition run along a tool path, the amount of the modeling or support material deposited along the tool path may vary with differences in meniscus heights of the molten material retained in liquefier assembly 38. These differences in meniscus heights occur due to several counteracting mechanisms. FIGS. 2A-2C illustrate these counteracting mechanisms, such as meniscus dry down effects, latent heating and material expansion, and filament diameter variations, each of which may alter the extrusion rates and flow controls of the liquefier assemblies, potentially resulting in inferior model quality.

As shown in FIG. 2A, liquefier assembly 38 includes cylindrical liquefier tube 42 and extrusion tip 44, and is shown melting and extruding the material of filament 40. In the shown example, filament 40 may be driven downward with a filament drive mechanism of the extrusion-based additive manufacturing system.

Liquefier assembly 38 includes a heated lower longitudinal region, referred to as zone 46. Liquefier tube 42 at zone 46 correspondingly heats and melts the material of filament 40 to form melt 48. The region above zone 46, referred to as zone 50, is not directly such that a thermal gradient is formed along the longitudinal length of liquefier tube 42.

The molten portion of the filament material (i.e., melt 48) forms meniscus 52 around the unmelted portion of filament 40. While operating at steady state, liquefier assembly 38 has its maximum flow rate dictated by its heated length and the thermal diffusivity of the filament material being extruded. As shown in FIG. 2A, during a steady-steady extrusion of the material through extrusion tip 44, the height of meniscus 52 is maintained at nominal height 54 along the longitudinal length of liquefier tube 42. The downward movement of filament 40 functions as a viscosity pump to extrude the material in melt 48 out of extrusion tip as extruded road 56. The hydraulic pressure required to extrude the material out of extrusion tip 44 is generated by shearing the flow of the molten material within a few millimeters of meniscus 52 using the viscosity pump action.

As shown in FIG. 2B, when the feed rate of filament 40 is increased, the height of meniscus 52 drops toward extrusion tip 44, such as to height 58. At first glance, this drop in height of meniscus 52, referred to herein as "dry down", appears to be counterintuitive. However, the dry down of meniscus 52 from nominal height 54 (shown in FIG. 2A) to height 58 occurs primarily due to two complimentary mechanisms. First, the pressure generated by a constant length of the viscosity pump action below meniscus 52 increases linearly with the shear rate. Second, the longitudinal length of the viscosity pump action below meniscus 52 increases with the feed rate of filament 40 because the time required to melt filament 40 in an inward axial direction from its outer surface is constant.

Therefore, the height of meniscus 52 is an unstable equilibrium, where two mechanisms counteract the vertical motion of meniscus 52. First, as meniscus 52 moves downward towards extrusion tip 44 and the flow rate increases, the average viscosity of melt 48 flowing through extrusion tip 44 increases, thereby requiring extra pressure to maintain the flow. Additionally, when the flow of the extruded material used to form road 56 is greater than an amount that will fit between extrusion tip 44 and the 3D model or the support structure, the extruded material generates an upward back-pressure.

Even small changes in the height of meniscus 52 can have substantial effects on the quality of the 3D model or support structure being built. As an example, for liquefier assembly 38 having cylindrical liquefier tube 42 with an inner diameter of 1.88 millimeters (0.074 inches) and with filament 40 having an average diameter of 1.78 millimeters (0.070 inches) (i.e., the gap is about 0.102 millimeters (about 0.004 inches)), a change in height of meniscus 52 of one inch may produce extruded road 56 having a length of about 250 millimeters (about 10 inches), a height of about 0.127 millimeters (about 0.005 inches), and a width of about 0.254 millimeters (about 0.010 inches), with no change in the position of filament 40.

Additionally, as shown in FIG. 2C, in the event that liquefier assembly 38, while operating at a steady-state extrusion rate at a modest speed, is suddenly directed to stop extruding, latent heat may continue to melt the filament material within liquefier tube 42. This molten material expands, thereby pushing meniscus 52 upward into zone 50 of liquefier tube 42, such as to height 60. The cooler temperature of zone 50 may then solidify the molten material within zone 50, thereby effectively plugging up liquefier assembly 38.

Furthermore, liquefier assembly 38 maybe susceptible to variations in the diameter of filament 40 over the length of filament 40. As the diameter of filament 40 increases, the viscosity pump action below meniscus 52 becomes more efficient due to the decrease in gap 56 between the outer surface of filament 40 and the inner surface of liquefier tube 42. As a result, the viscosity pump action pushes meniscus 52 downward. Alternatively, as the diameter of filament 40 decreases, the viscosity pump action below meniscus 52 becomes less efficient, resulting in meniscus 52 rising upward.

As shown in FIGS. 2A-2C, the extrusion properties of liquefier assembly 38 require a balance of counteracting mechanisms, such as meniscus dry down effects, latent heating and material expansion, and filament diameter variations. Variations in the height of meniscus 52 that are not accounted for can have substantial impacts on the deposition accuracies along tool paths, particularly at seam intersections of perimeter roads. This can potentially result in inferior model quality These counteracting mechanisms, however, may balance out during steady-state operation at a particular feed rate of filament 40. Accordingly, one technique for reducing variations in the height of meniscus 52, referred to as normalization, is to perform a purge operation at a constant extrusion rate until meniscus 52 settles to a constant height within liquefier assembly 38. Purge operations are typically performed when a liquefier assembly is heated up from a standby state to an operating state. As such, a purge operation may effectively bring meniscus 52 in liquefier assembly 38 to a known height based on the purge extrusion rate. Liquefier assembly 38 may then begin depositing the molten material along a tool path based on the known height of meniscus 52.

While purge operations are effective at normalizing the height of meniscus 52, they may also induce delays in the overall build time required to complete 3D model 24 and support structure 26, and may consume additional amounts of the modeling and support materials. This is particularly true when building large 3D models and support structures, and when requiring multiple purge operations during the formation of each layer.

As discussed below, pursuant to the method of the present disclosure, the height of meniscus 52 within liquefier assembly 38 may be normalized without requiring purge operations. In particular, each generated tool path may include a set point that directs liquefier assembly 38 to reduce the extrusion rate to a slower, constant extrusion rate prior to reaching an end point of the tool path. As such, by the time liquefier assembly 38 reaches the end point of the tool path, meniscus 52 settles to a constant and stable height within liquefier assembly 38. Liquefier assembly 38 may then begin depositing the material along a subsequent tool path with a known meniscus height.

Figure 3:
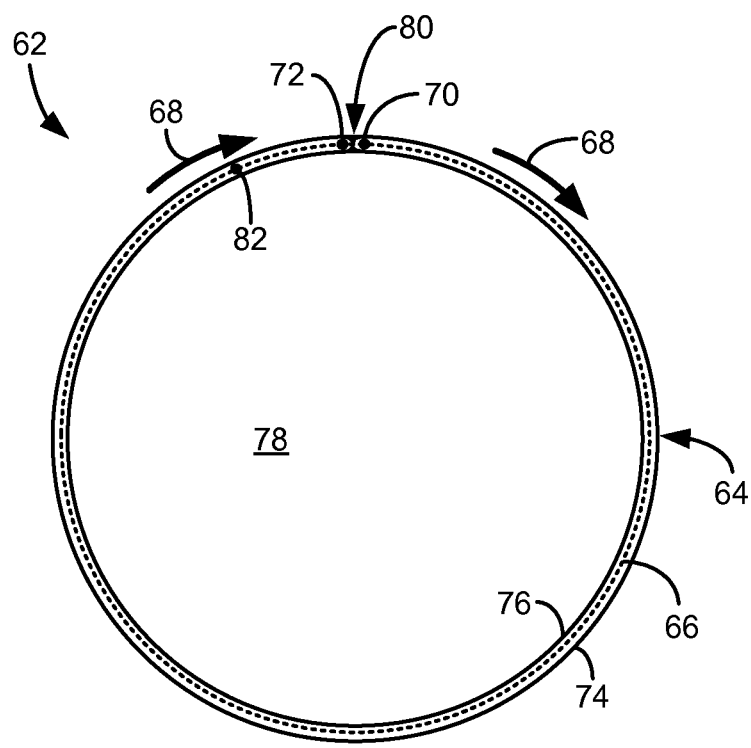
FIG. 3 is a top view of a layer of a 3D model being built with the liquefier assembly.
Figure 3:
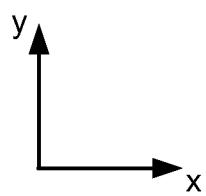

FIG. 3 illustrates layer 62, which is a layer of 3D model 24 formed by depositing a modeling material from liquefier assembly 38. While the following discussion of layer 62 is made with reference to liquefier assembly 38, the normalization of meniscus heights may also be performed with alternative liquefier assemblies, such as the stepped liquefier assemblies disclosed in U.S. Publication No. 2012/0070523.

As shown, layer 62 includes perimeter path 64, which is a road of a modeling material that is deposited by liquefier assembly 38 along contour tool path 66. Contour tool path 66 may be generated by computer 29 based on a road width, which is a predicted width of a deposited road of the modeling material, and may depend on a variety of factors, such as modeling material properties, the type of extrusion-based digital manufacturing system used, extrusion conditions, extrusion tip dimensions, and the like.

In the current example, the modeling material is deposited along contour tool path 66 in a clockwise direction, as represented by arrows 68, from start point 70 to end point 72 to form perimeter path 64. Alternatively, the modeling material may be along contour tool path 66 in a counter-clockwise direction. Perimeter path 64 includes exterior surface 74 and interior surface 76, which are each offset from contour tool path 66 by about one-half of the road width. Exterior surface 74 is the outward-facing surface of perimeter path 64 and may be observable when 3D model 24 is completed. Interior surface 76 is the inward-facing surface of perimeter path 64, which defines interior region 78. Interior region 78 is the region of layer 62 confined within perimeter path 64, and may be filled with additional modeling material deposited along additionally generated tool paths (e.g., raster paths, not shown).

Start point 70 is a first location in the x-y plane at which extrusion head 18 is directed to begin depositing the modeling material, and stop point 72 is a second location in the x-y plane at which extrusion head 18 is directed to stop depositing the modeling material. Accordingly, during the build operation, controller 28 directs extrusion head 18 to heat up from the standby state, and to begin depositing the modeling material at start point 70. Extrusion head 18 is then directed to move along contour tool path 66 in the direction of arrow 68 until reaching stop point 72, where extrusion head 18 stops depositing the modeling material.

This process provides a continuous road of the deposited modeling material at all locations around perimeter path 64 except at the intersection between points 70 and 72, where the outgoing and incoming roads meet. This intersection forms a seam for layer 62 (referred to as seam 80). Due to factors in the extrusion process, such as meniscus height variations, when starting and stopping the depositions, the modeling material deposited at end point 72 may bump into the modeling material previously deposited at start point 70. This bumping can form a significant bulge of the modeling materials at seam 80, which can be visually observed with the naked eye, thereby detracting from the aesthetic qualities of the resulting 3D model.

Alternatively, if not enough modeling material is deposited between points 70 and 72, a gap may be formed at the seam, which can increase the porosity of the 3D model. The increased porosity can allow gases and fluids to pass into or through the 3D model, which may be undesirable for many functional purposes (e.g., for containing liquids). Accordingly, under the conventional data generation technique, proper seam sealing may be difficult to achieve, particularly due to the number of geometric complexities that may be required for a given 3D model.

Pursuant to the method of the present disclosure, however, liquefier assembly 38 is operated in a manner that normalizes the meniscus height between deposition runs. In particular, while moving along contour tool path 66, controller 28 directs liquefier assembly 38 to reduce its extrusion rate at a predetermined point before reaching end point 70, such as at set point 82. For example, when set point 82 is reached, controller 28 may direct drive mechanism 34 to reduce the feed rate of filament 40 into liquefier assembly 38 from a standard feed rate used between start point 70 and set point 82, to a slower, constant feed rate between set point 82 and end point 72. This reduced feed rate correspondingly reduces the extrusion rate of melt 48 to a slower, constant extrusion rate.

The distance between set point 82 and end point 72 along contour tool path 66 chosen so as to provide enough time for meniscus 52 to settle to a stable height prior to, or upon reaching end point 72. On the other end, the distance is also desirably set to minimize the amount of time that liquefier assembly 38 is required to extrude at the slower, constant extrusion rate. Suitable time periods for allowing meniscus 52 to settle may vary depending on the design of the particular liquefier assembly and the velocity of the extrusion head along the tool path. Suitable time periods range from about 3 seconds to about 20 seconds, with particularly suitable time periods ranging from about 4 seconds to about 10 seconds.

Because tool paths typically require much longer than these suitable time periods, the slowdown in the extrusion rate at set point 82 has little effect on the overall build time, and incurs less delay than the time required to perform a purge operation. Suitable reduced extrusion rates between point 82 and end point 72 range from about one-quarter to about one-half of a standard operating extrusion rate for extrusion head 18, with particularly suitable reduced extrusion rates ranging from about one-quarter to about one-third of the standard operating extrusion rate for extrusion head 18. The standard operating extrusion rate may vary, and typically ranges from about 500 mics to about 2,000 mics.

Accordingly, meniscus 52 may settle to a known stable height before liquefier assembly 28 transitions to a subsequent tool path or switches to a standby state. This allows controller 28 and computer 29 to more accurately position start point 70 and end point 72 to minimize effects at seam 80, such as material bulging and material gaps. This correspondingly increases part quality in 3D model 24.

Figure 4:
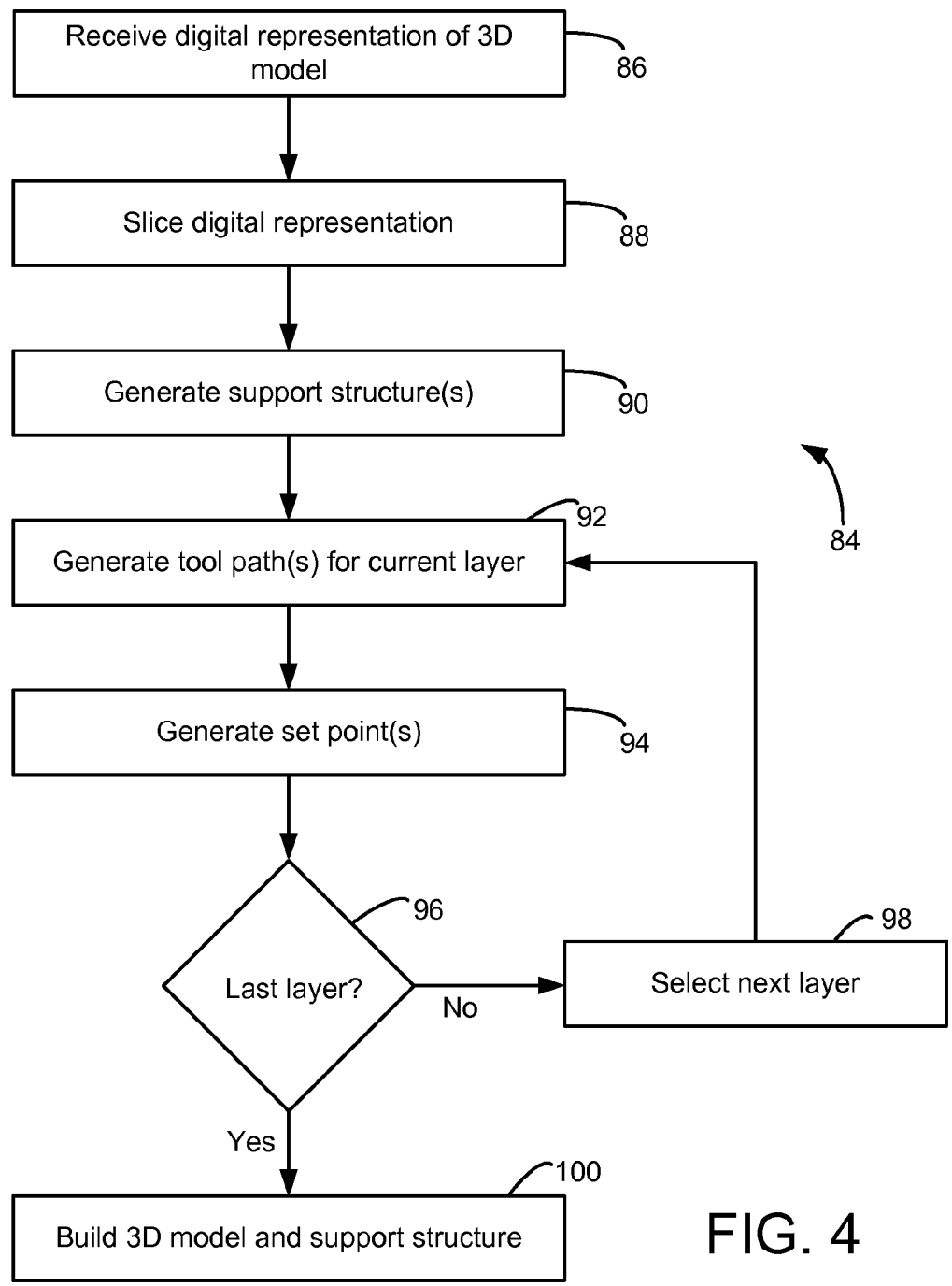
FIG. 4 is a flow diagram of a method for generating data and building a 3D model with the extrusion-based additive manufacturing system.

FIG. 4 is a flow diagram of method 84 for generating data and building a 3D model based on a digital representation of the 3D model. The following discussion of method 84 is made with reference to 3D model 24 (shown in FIG. 1), liquefier 38 (shown in FIGS. 2A-2C), and layer 62 of 3D model 24 (shown in FIG. 3). However, method 84 is applicable for building 3D models and corresponding support structures having a variety of different geometries.

As shown in FIG. 4, method 84 includes steps 86-100, and initially involves receiving a digital representation of 3D model 24 (step 86), slicing the digital representation and into multiple layers (step 88), and generating one or more pre-sliced support structures with computer 29 (step 90). In an alternative embodiment, steps 88 and 90 may be reversed such that one or more support structures are generated and the digital representation and the generated support structure(s) are then sliced.

Computer 29 then selects a first layer of the sliced layers and generates one or more contour tool paths based on the perimeter of the layer, and may also generate one or more additional tool paths (e.g., raster paths) to bulk fill the interior region 78 (step 92). For example, computer 29 may generate contour tool path 66, having start point 70 and end point 72, that defines the outer ring for perimeter path 64. In alternative examples, a given layer may include multiple contour tool paths and raster paths for building multiple and separate parts and/or may include an exterior and an interior contour tool path for a single part (e.g., having a hollow interior cavity).

Computer 29 may then generate a set point at a predetermined location along each generated tool path, including set point 82 along contour tool path 66 (step 94). As discussed above, the predetermined location is set to provide sufficient time for meniscus 52 to settle to a known height within liquefier assembly 38. On the other end, the predetermined location is also desirably set to minimize the amount of time that liquefier assembly 38 is required to extrude at the slower, constant extrusion rate. The above-discussed suitable times provide a balance between these countering factors. For example, the generated set point 82 may include instructions for reducing the extrusion rate from a first rate used to build perimeter path 64 between start point 70 and point 82, to a second reduced, constant rate used to build the remainder of perimeter path 64 between point 82 and end point 72.

In some embodiments, step 94 may be omitted for interior fill tool paths, such as interior fill raster tool paths. In these embodiments, set points may be generated only for the contour tool paths, which include seams that are visibly observable. This allows the interior regions to be quickly filled along the raster tool paths.

When the layer is completed, computer 29 may then determine whether the current layer is the last of the sliced layers (step 98). In the current example, layer 62 is not the last layer. As such, computer 29 may select the next layer (step 100) and repeat steps 92-100 until the last layer is completed. When the last layer is completed, computer 29 may transmit the resulting data to system 10 for building 3D model 24 and support structure 26 (step 102).

During the build operation, extrusion head 18 follows the patterns of the tool paths for each layer, and reduces the extrusion rates of the modeling material when the set point is reached for each tool path. This allows meniscus 52 to settle to a known and stable height within liquefier assembly 38, which accordingly reduces the variations in extrusion rates between deposition runs, and minimizes the effects on the seams between start and end points for a given perimeter path.

The above-discussed method for normalizing the meniscus height within a liquefier assembly is also suitable for use with liquefier assemblies that transition quickly from standby states to stable operating states. With this combination, the deposition process may be performed in a substantially continuous manner, with the need for purge operations. Examples of suitable liquefier assemblies for use in this embodiment include the stepped liquefier assemblies disclosed in U.S. Publication No. 2012/0070523.

Figure 5:
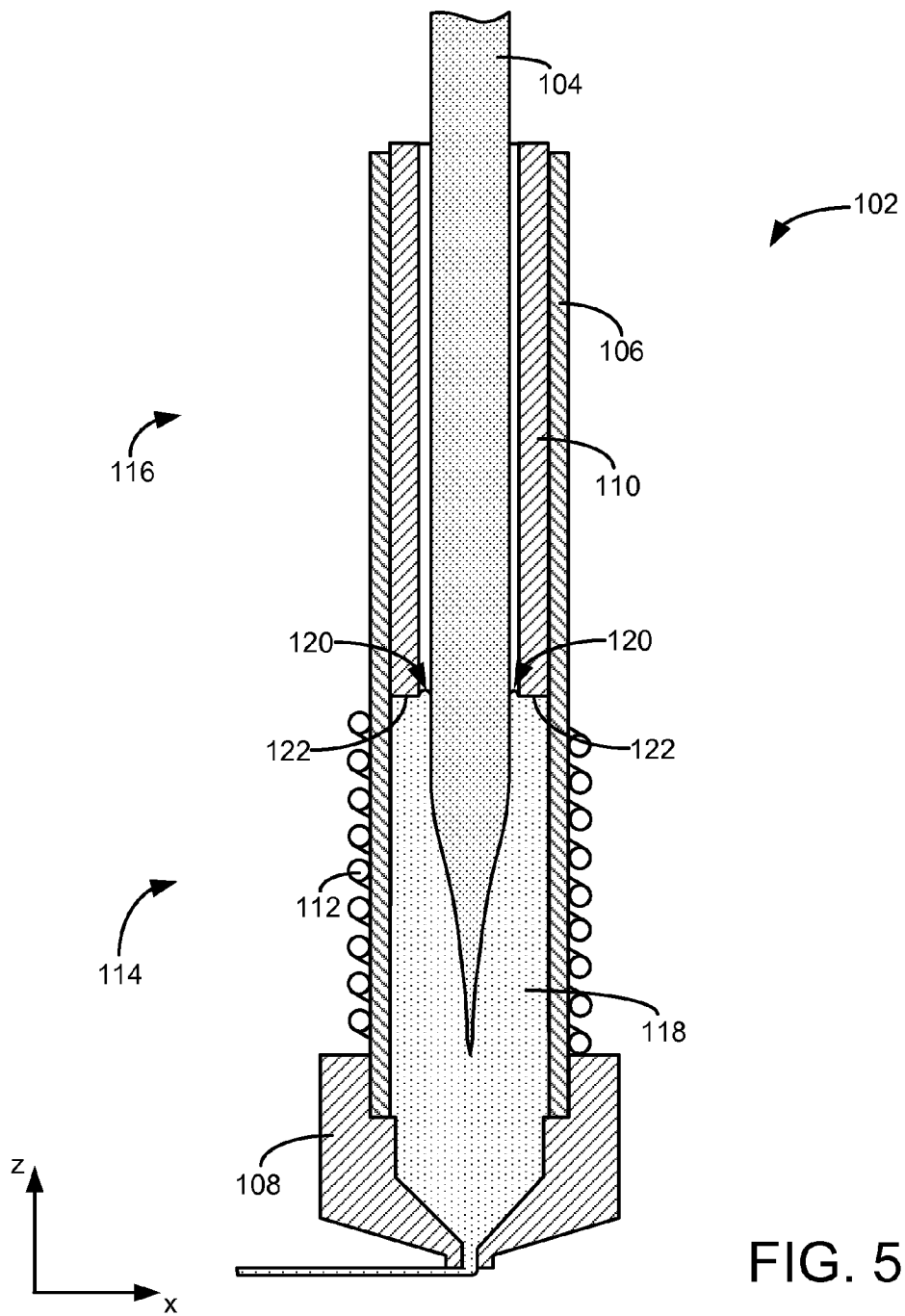
FIG. 5 is a side sectional view of a stepped liquefier assembly.

FIG. 5 illustrates liquefier assembly 102 in use with filament 104, where liquefier assembly 102 is an example of a suitable stepped liquefier assembly for use in system 10 (shown in FIG. 1). As shown, liquefier assembly 102 includes liquefier tube 106, extrusion tip 108, and hollow liner 110, where hollow liner 110 has a smaller inner diameter than liquefier tube 106, thereby providing a stepped cross-sectional area.

Liquefier tube 106 functions as a thin-wall liquefier for transferring heat from one or more external heat transfer components, such as heating coil 112, to filament 104 retained within liquefier tube 106. Heating coil 112 desirably extends around a lower portion of liquefier tube 106 and/or extrusion tip 108 to define zone 114 for heating and melting filament 104. The region above zone 114, referred to as zone 116, is desirably not directly heated by heating coil 112 such that a thermal gradient is formed along the longitudinal length of liquefier tube 106.

During a build operation with filament 104, successive solid segments of filament 104 are fed through hollow liner 110 and into zone 114 of liquefier tube 106. The successive solid segments are then melted in zone 114 to provide molten material, referred to as melt 118. Melt 118 forms or otherwise defines meniscus 120 around the unmelted portion of filament 104, where the upward movement of meniscus 120 is substantially blocked by shoulder 122 of hollow liner 110. Additional disclosure of liquefier assembly 102, its alternative embodiments, and its operation are disclosed in U.S. Publication No. 2012/0070523.

In some embodiments, liquefier assembly 102 transitions quickly between a standby state and a stable operating state. In these embodiments, the fast transition is due to factors such as the combination of low thermal mass, air cooling, good axial thermal conduction, and low thermal resistance between the heating element(s) and the liquefier tubes. Accordingly, suitable transition times between the standby states and the operating states include about 10 seconds or less, with particularly suitable transition times including about 5 seconds or less.

In one embodiment, the set point for normalizing meniscus heights may be coordinated with the height of shoulder 122. As discussed in U.S. Publication No. 2012/0070523, shoulder 122 is configured to restrict the movement of meniscus 120 along the longitudinal length of liquefier assembly 102. As such, the location of the set point (e.g., set point 82) and the reduced, constant extrusion rate may be determined to coordinate to allow meniscus 120 to have a stable height at the height of shoulder 122.

Alternatively, in a reciprocating manner, in embodiments in which the set point and the reduced constant extrusion rate are preset (e.g., preset in software or firmware in controller 28 and/or computer 29), hollow liner 110 may be positioned along liquefier tube 106 such that shoulder 122 is set at a height that coordinates with the stable height of meniscus 120 when liquefier assembly extrudes melt 118 at the reduced, constant extrusion rate.

The quick transition of liquefier assembly 102 allows controller 28 to anticipate heat up times between multiple liquefier assemblies 102. For example, as shown in FIG. 6, in an embodiment in which extrusion head 18 (shown in FIG. 1) includes two liquefier assemblies 102, referred to as liquefier assemblies 102m and 102s, controller 28 may direct the relative standby and operating states to allow liquefier assemblies 102m and 102s to collectively deposit materials in a substantially continuous manner.

In the shown example, liquefier assembly 102m is a first liquefier assembly configured to receive filament 104m of a modeling material, and to melt and extrude the modeling material as melt 118m. Correspondingly, liquefier assembly 102s is a second liquefier assembly configured to receive filament 104s of a support material, and to melt and extrude the support material as melt 118s. For ease of discussion, liquefier assemblies 102m and 102s are depicted as being maintained at the same elevation. However, one of liquefier assemblies 102m and 102s is desirably toggled up and down relative to the other as discussed in LaBossiere, et al., U.S. Pat. No. 7,604,470; and Leavitt, U.S. Pat. No. 7,625,200.

Figure 6:
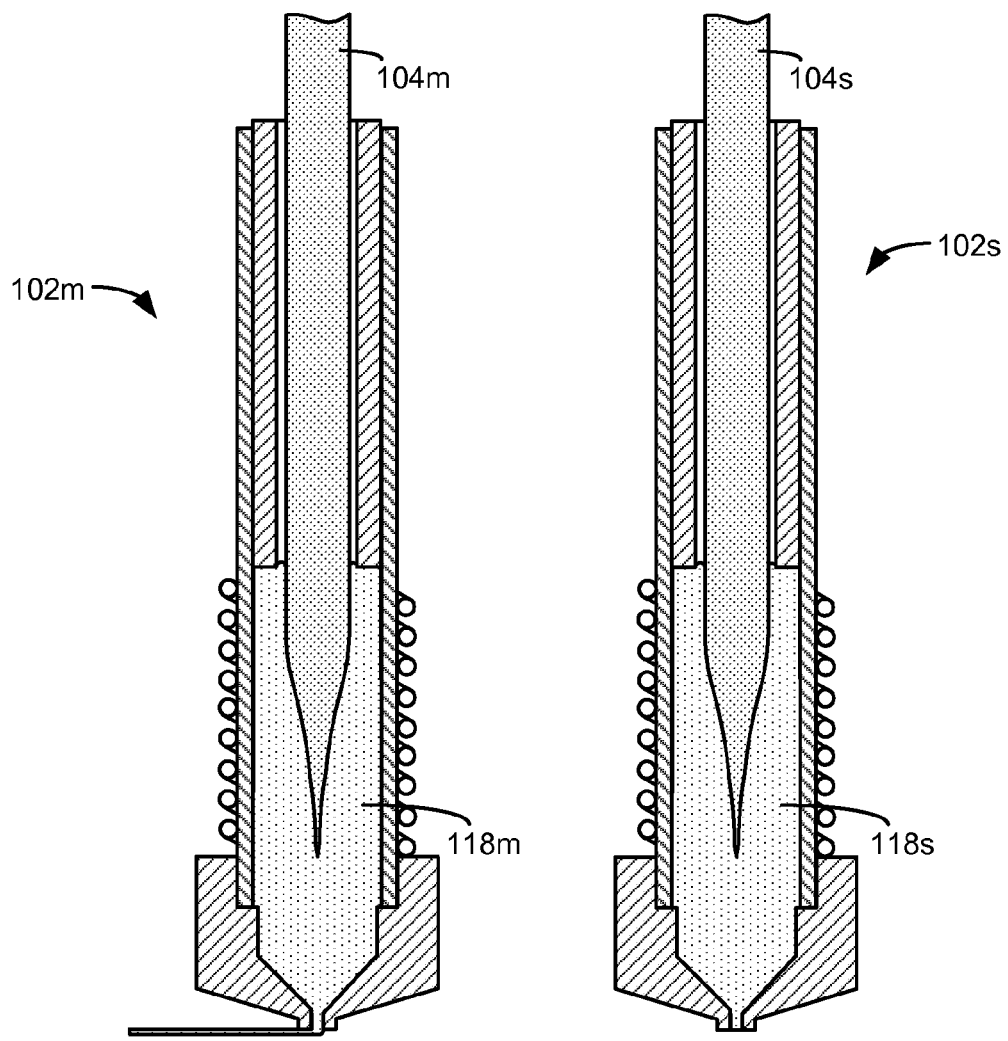
FIG. 6 is a side sectional view of a pair of stepped liquefier assemblies.

As shown in FIG. 6, liquefier assembly 102m is extruding and depositing a road of modeling material from melt 118m along a tool path. As such, liquefier assembly 102m is currently heated up to an operating state and liquefier assembly 102s is currently cooled down to a standby state. Liquefier assemblies 102m and 102s are configured to cool down to standby states to reduce polymer degradation, to reduce drooling and oozing of the molten materials, and to allow quicker start ups.

Liquefier assembly 102m continues to deposit the modeling material along the tool path at one or more extrusion rates until a set point (e.g., set point 82, shown in FIG. 3) is reached. Controller 28 then directs the drive mechanism (e.g., drive mechanism 34, shown in FIG. 1) to reduce the feed rate of filament 104m into liquefier assembly 102m. This correspondingly reduces the extrusion rate of the modeling material from liquefier assembly 102m to a slower, constant extrusion rate. This allows the meniscus of melt 118m to normalize at a known stable height. This is in addition to the stepped cross-sectional areas of liquefier assembly 102m, which also restricts movement of the meniscus of melt 118m.

When liquefier assembly 102m reaches the end point of the tool path, controller 28 directs liquefier assembly 102m to quickly cool down to its standby state. Controller 28 also directs liquefier assembly 102s to heat up to its operating state as liquefier assembly 102m reaches the end point of the tool path. The short transition time desirably allows liquefier assembly 102s to be fully heated by the time extrusion head 18 repositions in the x-y plane for depositing the support material at a start point of a second tool path.

Liquefier assembly 102s is then directed to deposit the support material along the second tool path at one or more extrusion rates until a set point is reached. Controller 28 then directs the drive mechanism (e.g., drive mechanism 36, shown in FIG. 1) to reduce the feed rate of filament 104s into liquefier assembly 102s. This correspondingly reduces the extrusion rate of the support material from liquefier assembly 102s to a slower, constant extrusion rate. This allows the meniscus of melt 118s to normalize at a known stable height, in addition to the stepped cross-sectional areas of liquefier assembly 102s.

When liquefier assembly 102s reaches the end point of the tool path, controller 28 directs liquefier assembly 102m to heat up to its operating state. The short transition time desirably allows liquefier assembly 102m to be fully heated by the time extrusion head 18 repositions in the x-y plane for depositing the modeling material at a start point of a third tool path. At this point, controller 28 may also direct liquefier assembly 102s to quickly cool down to its standby state.

Liquefier assembly 102m is then directed to deposit the modeling material along the third tool path. Because the meniscus of melt 118m was normalized at a known stable height prior to the quick cool down to the standby state, and because liquefier assembly 102m heats up quickly to its operating stable (e.g., within a few seconds), the known stable height of the meniscus of melt 118m is maintained, thereby precluding the need for a separate purge operation.

Correspondingly, after a subsequent transition in which liquefier assembly 102s is in its operating state, the known stable height of the meniscus of melt 118s is also maintained, thereby precluding the need for a separate purge operation. As such, the combination of the quick transitions between the standby states and the stable operating states, along with the normalization of the meniscus heights, allows the modeling and support materials to be deposited in a substantially continuous manner. In particular, controller 28 may direct extrusion head 18 to move directly to the next deposition coordinates to begin deposition runs without requiring extrusion head 18 to move away from the deposition site to perform purge operations. Thus, as soon as the deposition of the modeling material is completed for a given layer, extrusion head 18 may be moved directly to the start point of the first tool path to readily begin depositing the support material for the given layer.

It is noted that without the normalization of the meniscus heights, separate purge operations would be required before liquefier assemblies 102m and 102s begin depositing materials (e.g., after each transition from the standby state to the operating state). As such, the benefits attained with the quick transitions between the standby states and the operating states are not optimized due to the separate purge operations. Thus, the combination of the quick transitions and the normalization of the meniscus heights substantially reduces the overall time required to build 3D models and support structures to an extent that is unattainable with either the quick transitions or the normalization of the meniscus alone.

Accordingly, the method of the present disclosure reduces variations in extrusion rates and provides good seam quality for the 3D models. This is in addition to performing the deposition runs in a substantially continuous manner, which may substantially reduce the overall time required to build 3D models and support structures.

Although the present disclosure has been described with reference to preferred embodiments, workers skilled in the art will recognize that changes may be made in form and detail without departing from the spirit and scope of the disclosure.

The invention claimed is:

1. A method for building a three-dimensional model with an extrusion-based additive manufacturing system having an extrusion head, the method comprising:
depositing a consumable material from a liquefier assembly of the extrusion head at one or more extrusion rates while moving the extrusion head along a first portion of a first generated tool path;
reducing the extrusion rate from the one or more extrusion rates to a slower, constant extrusion rate at a predetermined point along the first generated tool path, the predetermined point being before an end point of the first generated tool path;
depositing the consumable material from the liquefier assembly at the reduced, constant extrusion rate while moving the extrusion head along a second portion of the first generated tool path, the second portion bounded by the predetermined point and the end point to substantially normalize a meniscus height within the liquefier assembly before or upon the extrusion head reaching the end point of the first generated tool path;
moving the extrusion head to a successive-layer tool path while substantially maintaining the normalized meniscus height and without performing a purge operation; and
depositing the consumable material from the liquefier assembly while moving the extrusion head along the successive-layer tool path.

2. The method of claim 1, wherein moving the extrusion head along the second portion of the first generated tool path comprises moving the extrusion head for a duration ranging from about 3 seconds to about 20 seconds.

3. The method of claim 2, wherein the duration ranges from about 4 seconds to about 10 seconds.

4. The method of claim 1, wherein the liquefier assembly comprises a stepped cross-sectional area.

5. The method of claim 1, and further comprising:
cooling down the liquefier assembly after the meniscus height is substantially normalized; and
heating up the cooled down liquefier assembly prior to depositing the consumable material from the liquefier assembly while moving the extrusion head along the successive-layer tool path.

6. The method claim 5, wherein heating up the cooled down liquefier assembly comprises heating up the cooled down liquefier assembly to an operating temperature within about 10 seconds.

7. A method for building a three-dimensional model with an extrusion-based additive manufacturing system having an extrusion head, the method comprising:
generating tool paths for building a plurality of layers of the three-dimensional model, wherein each of the generated tool paths comprises a start point and an end point;
generating a set point between the start point and the end point for at least a first tool path of the generated tool paths;
depositing a consumable material from a liquefier assembly of the extrusion head at one or more extrusion rates while moving the extrusion head along the first tool path between the start point and the set point;
depositing the consumable material from the liquefier assembly at a reduced and constant extrusion rate while moving the extrusion head along the first tool path between the set point and the end point to substantially normalize a meniscus height within the liquefier assembly; and
moving the extrusion head to a successive-layer tool path of the generated tool paths while substantially maintaining the normalized meniscus height and without performing a purge operation; and
depositing the consumable material from the liquefier assembly while moving the extrusion head along the successive-layer tool path.

8. The method of claim 7, wherein a location of the set point relative to the end point along the first tool path defines a time period of movement of the extrusion head ranging from about 3 seconds to about 20 seconds.

9. The method of claim 8, wherein the time period ranges from about 4 seconds to about 10 seconds.

10. The method of claim 7, wherein the liquefier assembly comprises:
a liquefier tube having an inlet end, and outlet end, and a first inner cross-sectional area;
a hollow liner having an outlet end disposed at least partially within the liquefier tube at a location between the inlet end of the liquefier tube and the outlet end of the liquefier tube, and having a second inner cross-sectional area that is less than the first inner cross-sectional area to define a shoulder; and
an extrusion tip secured to the liquefier tube at a offset location from the hollow liner.

11. The method of claim 7, and further comprising:
cooling down the first liquefier assembly after reaching the end point of the first tool path;
heating up the cooled down liquefier assembly prior to depositing the consumable material from the liquefier assembly while moving the extrusion head along the successive-layer tool path.

12. The method of claim 7, wherein the liquefier assembly comprises a stepped cross-sectional area.

13. A method for building a three-dimensional model with an extrusion-based additive manufacturing system having an extrusion head, the method comprising:
feeding a consumable material filament into a liquefier assembly of the extrusion head;
melting the consumable material filament in the liquefier to form a melt of molten material, wherein the melt defines a meniscus in the liquefier tube;
extruding the melt out of the liquefier assembly;
moving the extrusion head along a first tool path while extruding the melt;
restricting movement of the meniscus along a longitudinal length of the liquefier assembly while moving the extrusion head along the first tool path, such that a height of the meniscus within the liquefier assembly is substantially normalized upon reaching an endpoint of the first tool path;
moving the extrusion head to a successive-layer tool path while substantially maintaining the normalized meniscus height and without performing a purge operation; and
depositing the melt from the liquefier assembly while moving the extrusion head along the successive-layer tool path.

14. The method of claim 13, wherein the liquefier assembly comprises:
a liquefier tube having an inlet end, and outlet end, and a first inner cross-sectional area;
a hollow liner having an outlet end disposed at least partially within the liquefier tube at a location between the inlet end of the liquefier tube and the outlet end of the liquefier tube, and having a second inner cross-sectional area that is less than the first inner cross-sectional area to define a shoulder; and an extrusion tip secured to the liquefier tube at a offset location from the hollow liner.

15. The method of claim 14, wherein restricting movement of the meniscus along the longitudinal length of the liquefier assembly comprises at least partially blocking movement of the meniscus with the shoulder.

16. The method of claim 15, and further comprising:
generating a set point along the first tool path; and
depositing the extruded melt at a constant extrusion rate while moving the extrusion head along the first tool path between the set point and the end point of the first tool path, wherein the constant extrusion rate causes the height of the meniscus within liquefier assembly to substantially normalize at the shoulder.

17. The method of claim 16, wherein the set point and the constant extrusion rate are determined based on a height of the shoulder along the longitudinal length of the liquefier assembly.

* * * * *